(12) United States Patent
Woodard et al.

(10) Patent No.: US 8,210,943 B1
(45) Date of Patent: Jul. 3, 2012

(54) TARGET INTERFACE

(75) Inventors: Bruce Woodard, Foster City, CA (US); Dylan Jobe, Foster City, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 1330 days.

(21) Appl. No.: 11/650,311

(22) Filed: Jan. 4, 2007

Related U.S. Application Data (60) Provisional application No. 60/798,031, filed on May 6, 2006.

(51) Int. Cl.
*A63F 13/00* (2006.01)

(52) U.S. Cl. ............ 463/31; 463/1; 463/2; 463/5; 463/8; 463/33; 463/34

(58) Field of Classification Search ................... 463/2, 5, 463/1, 8, 31, 33–34
See application file for complete search history.

(56) References Cited

U.S. PATENT DOCUMENTS

| | | | |
|---|---|---|---|
| 4,701,130 A | 10/1987 | Whitney et al. | |
| 4,787,051 A | 11/1988 | Olson | |
| 4,843,568 A | 6/1989 | Krueger | |
| 5,128,671 A | 7/1992 | Thomas, Jr. | |
| 5,440,326 A | 8/1995 | Quinn | |
| 5,528,265 A | 6/1996 | Harrison | |
| 5,947,823 A | 9/1999 | Nimura | |
| 6,017,272 A | 1/2000 | Rieder | |
| 6,072,571 A | 6/2000 | Houlberg | |
| 6,157,368 A | 12/2000 | Faeger | |
| 6,210,273 B1 * | 4/2001 | Matsuno | 463/8 |
| 6,273,818 B1 | 8/2001 | Komoto | |
| 6,283,861 B1 | 9/2001 | Kawai et al. | |
| 6,319,121 B1 | 11/2001 | Yamada et al. | |
| 6,375,571 B1 | 4/2002 | Ohnuma et al. | |
| 6,375,572 B1 | 4/2002 | Masuyama | |
| 6,409,604 B1 | 6/2002 | Matsuno | |
| 6,413,163 B1 | 7/2002 | Yamauchi et al. | |
| 6,419,580 B1 | 7/2002 | Ito | |
| 6,533,663 B1 | 3/2003 | Iwao et al. | |
| 6,955,296 B2 | 10/2005 | Lusher et al. | |
| 6,992,596 B2 | 1/2006 | Cole et al. | |
| 7,121,946 B2 | 10/2006 | Paul et al. | |
| 7,137,891 B2 | 11/2006 | Neveu et al. | |
| 7,158,118 B2 | 1/2007 | Liberty | |
| 7,239,301 B2 | 7/2007 | Liberty et al. | |
| 7,262,760 B2 | 8/2007 | Liberty | |

(Continued)

FOREIGN PATENT DOCUMENTS

EP 0 913 175 5/1999

(Continued)

OTHER PUBLICATIONS

FantaVision Game Manual, Sony Computer Entertainment, Inc. 2000.

(Continued)

*Primary Examiner* — Sunit Pandya
(74) *Attorney, Agent, or Firm* — Lewis and Roca LLP (57) ABSTRACT

A system for targeting and attack of one or more enemies in a game environment is provided. A player may designate an enemy or enemies on a display screen as a target and subsequently initiate an attack of the targeted enemy or enemies. The display allows for flexibility in choosing which enemies to attack.

21 Claims, 9 Drawing Sheets

U.S. PATENT DOCUMENTS

| | | |
|---|---|---|
| 7,414,611 B2 | 8/2008 | Liberty |
| 7,489,298 B2 | 2/2009 | Liberty et al. |
| 7,489,299 B2 | 2/2009 | Liberty et al. |
| 2002/0085097 A1 | 7/2002 | Comenarez |
| 2004/0212589 A1 | 10/2004 | Hall |
| 2007/0060391 A1* | 3/2007 | Ikeda et al. ............ 463/46 |

FOREIGN PATENT DOCUMENTS

| | | |
|---|---|---|
| GB | 2388418 A | 12/2003 |
| JP | 07-178246 | 7/1995 |
| JP | 11-197359 | 7/1999 |
| JP | 2001-009156 | 1/2001 |

OTHER PUBLICATIONS

Keith Diefendorff, "Sony's Emotionally Charged Chip," Microprocessor Report, vol. 13, No. 5, Apr. 19, 1999.

Wikipedia—The Free Encyclopedi, "AIMBOT," http://en.wikipedia.org/wiki/Aimbot, updated Jun. 3, 2005, last accessed Jul. 5, 2005.

Bolt, R.A., "Put-that-there": voice and gesture at the graphics interface, Computer Graphics, vol. 14, No. 3, (ACM SIGGRAPH Conference Proceedings) Jul. 1980, pp. 262-270.

DeWitt, Thomas and Edelstein, Phil, "Pantomation: A System for Position Tracking," Proceedings of the 2nd Symposium on Small Computers in the Arts, Oct. 1982, pp. 61-69.

* cited by examiner

TARGET INTERFACE

CROSS-REFERENCE TO RELATED APPLICATIONS

This application claims the priority benefit of U.S. provisional patent application No. 60/798,031 filed May 6, 2006 and entitled "Dynamic Target Interface." The disclosure of this application is incorporated herein by reference.

This application is related to U.S. patent application Ser. No. 11/382,031 filed May 6, 2006 and entitled "Multi-Input Game Controller Mixer," the disclosure of which is incorporated herein by reference.

This application is related to U.S. patent application Ser. No. 11/382,032 filed May 6, 2006 and entitled "System for Tracking User Manipulations within an Environment," the disclosure of which is incorporated herein by reference.

This application is related to U.S. patent application Ser. No. 11/382,033 filed May 6, 2006 and entitled "System, Method, and Apparatus for Three-Dimensional Input Control," the disclosure of which is incorporated herein by reference.

This application is also related to U.S. patent application Ser. No. 11/382,035 filed May 6, 2006 and entitled "Inertially Trackable Hand-Held Controller," the disclosure of which is incorporated herein by reference.

This application is also related to U.S. patent application Ser. No. 11/382,036 filed May 6, 2006 and entitled "Scheme for Detecting and Tracking User Manipulation of a Game Controller Body," the disclosure of which is incorporated herein by reference.

This application is also related to U.S. patent application Ser. No. 11/382,041 filed May 6, 2006 and entitled "Scheme for Translating Movements of a Hand-Held Controller Into Inputs for a System," the disclosure of which is incorporated herein by reference.

This application is also related to U.S. patent application Ser. No. 11/382,038 filed May 6, 2006 and entitled "Detectable and Trackable Hand-Held Controller," the disclosure of which is incorporated herein by reference.

This application is related to U.S. patent application Ser. No. 11/382,040 filed May 6, 2006 and entitled "Method for Mapping Movements of a Hand-Held Controller to Game Commands," the disclosure of which is incorporated herein by reference.

This application is related to U.S. patent application Ser. No. 11/382,034 filed May 6, 2006 and entitled "Scheme for Detecting and Tracking User Manipulations of a Game Controller Body, the disclosure of which is incorporated herein by reference.

This application is related to U.S. patent application Ser. No. 11/382,037 filed May 6, 2006 and entitled "Scheme for Translating Movements of a Hand-Held Controller into Inputs for a System," the disclosure of which is incorporated herein by reference.

This application is related to U.S. Pat. No. 6,995,788 for a "System and Method for Camera Navigation," the disclosure of which is incorporated herein by reference.

The present application is related to U.S. patent application Ser. No. 09/773,452 filed Jan. 31, 2002 and entitled "Game Playing System with Assignable Attack Icons." The disclosure of this application is incorporated herein by reference.

BACKGROUND OF THE INVENTION

1. Field of the Invention

The present invention relates generally to video games and, more particularly, to targeting and attacking of objects in a video game system.

2. Description of the Related Art

In a video game, a game player is commonly represented by a video game character or an object (e.g., a combat aircraft) that can move about a virtual environment displayed on a display screen. Both a character and an object are referred to hereinafter as a character for the sake of simplicity; no limitation as to only a character versus an object or any other type of video game entity is implied. The game player typically controls the actions of the character using a video game controller that includes a joystick and one or more buttons. In one common type of game, the character encounters various scenarios throughout the course of the game. Such scenarios could include a competition scenario where the character competes against an opponent or a combat scenario where the character is required to fight and conquer one or more threats or enemies such as approaching enemy aircraft. The enemies typically approach the character from one or more directions on the display screen and then attack the character. The player uses the video game control to move the character and cause the character to attack enemies or defend against the enemy attacks using a weapon such as a 30 mm cannon, heat seeking missiles, EMP weapon, and the like.

In order to engage an opponent or attack an enemy, the game player typically uses a joystick or direction button on the controller to maneuver the character so that the character is facing the enemy. The game player then presses a controller button, which is a button on the controller that causes the character to initiate an attack action, such as firing the cannon or launching a missile. Other types of weapons, especially with regard to actual characters (versus an object like a combat aircraft) include jabbing a sword or throwing a punch. The controller may include multiple controller buttons, each of which may be associated with an attack action. Typically, a controller button is fixedly associated with an attack action. That is, when the player presses the button, the video game character always initiates the attack action regardless of whether the character is actually facing an enemy or even near an enemy.

It can be appreciated that video game combat is simplest when there are few enemies present simultaneously on the display screen, thereby making it relatively easy for the game player to correctly maneuver the character into an attack position so that the attack action has an affect on the desired enemy. For example, if there is only one enemy on the display screen, the game player can concentrate attention on the single enemy. Consequently, the game player can orient the character to face that enemy and initiate an attack on the enemy with relative ease.

As the number of enemies on the display screen increases, it becomes increasingly difficult for the player to attack specific enemies. The character may be surrounded by several enemies each of which moves about, making it difficult for the game player to correctly maneuver the character to face a specific enemy. The sheer number of enemies may also make it difficult for the game player to discern when the character is actually facing a specific enemy for attack. For example, if several enemies are grouped closely together or approaching at a high rate of speed, it may be unclear to the game player exactly which enemy the character is facing and, consequently, which enemy the character will attack upon pressing of the controller button. Unfortunately, this may result in the character initiating an attack on one enemy when the player actually intended to initiate an attack on a different enemy.

Another problem associated with simultaneously confronting multiple enemies is that it becomes difficult for the game player to attack a succession of different enemies. Under the conventional attack method, the game player has to orient the character toward a first enemy and then attack that enemy. In order to subsequently attack a second enemy, the game player must first maneuver the character so that the character is facing the second enemy. This can become quite cumbersome for the player, particularly if the second enemy is located at an awkward position relative to the character, such as behind the character or at a distance removed from the character. This often results in the player fumbling with the joystick and losing an attack opportunity. The requirement of re-orienting the character to the second enemy also takes time, which can be detrimental in an action game where characters must successfully and quickly attack enemies with success or otherwise risk incurring damage from the enemies.

The significance of the aforementioned problems has only increased as the graphics processing power of video game systems has increased. Modern video game systems are able to display and control an increasing number of enemy characters on the video game display at one time. Thus, it is becoming even more difficult and cumbersome for game players to target and attack specific enemies in a video game environment.

One way of overcoming the difficulty in targeting and attacking enemies is to simply provide the video game character with a larger or more powerful weapon having a relatively large attack range. A larger attack range increases the likelihood of a successful attack regardless of whether the character is correctly oriented to an enemy. Consequently, larger weapons provide the game player with a greater margin of error in orienting the character relative to an enemy. For example, if the character (like a warrior) is equipped with a small sword with a small attack range, then the player may have to precisely orient the character relative to an enemy in order to successfully attack the enemy. If the character is equipped with a large battle axe, however, then the character need only swing the battle axe in the vicinity of the enemy and rely on the large range of the weapon to encompass the enemy.

Similarly, if the character (such as a military aircraft) is armed with a single machine gun, precise orientation of the cross-hairs relative to the enemy is required if a successful attack is desired. The problem becomes even more drastic if the enemy happens to be in motion and at a distance wherein the character must 'lead' the target to ensure munitions expended from the machine gun come into contact with the enemy in at the same time and in the same space. Similar to the aforementioned ground-based warrior, if a larger or more powerful weapon is used (e.g., an EMP weapon), the character need only launch the weapon in the general vicinity of the enemy to ensure a direct (or at least effective) hit.

Unfortunately, such a solution results in a 'hack and slash' combat scenario or 'fire at will' scenario where the game player can disregard the video game character's orientation relative to an enemy. The player simply moves the character through a battle scene and wildly presses the controller button, hoping that the wide range of the resultant attacks will include a great number of enemy hits. Similarly, as would be the case with an attack aircraft, the game player may simply fire their weapons at-will hoping that one or more weapons launches come into contact with a random enemy. While such hack and slash or fire-at-will games can be fun, they are also simplistic and can result in the video game player quickly losing interest in the game. As game systems become more sophisticated, game players are demanding a richer and more realistic video game experience that both challenges the player and more closely simulates a real world scenario. Similarly, the game may include a life force or stamina meter wherein the game player expends all their stamina hacking and slashing or a limited number of munitions that are prematurely expended by randomly firing at enemies. A video game experience would be enriched by allowing players quick and easy targeting and attack of specific enemies in a combat scenario.

SUMMARY OF THE INVENTION

The system and methods disclosed herein provide an exemplary video game environment where a video game player may designate multiple objects in the video game environment for targeting, attack or engagement in video game competition. A player may quickly designate a candidate object on a display screen as a target for attack via, for example, the actuation of a control button on a device such as a video game controller. When the game player actuates the control button, the various candidates within the display indicator may be indicated as being subject to attack. One or more objects may be designated. The character may then initiate the attack regardless of whether the character is directly facing toward the enemy or indirectly facing the enemy (e.g., at an angle) through the release of the control button. The game player may then designate new objects for attack.

In some embodiments of the invention, the display indicator may be associated with the tilt, roll, yaw, and Z-axis control of a game character such as an attack aircraft. Control of the game character may occur through a control device offering control of various axes (e.g., x-, y-, z-) without having to manipulate a joystick device. Various tilt sensors and single- and/or multi-dimensional accelerometers may be utilized the control the placement of the display indicator in the game environment. Similarly, a gyroscope with three-directional orientation may be included for orientation purposes, thy gyroscope offering three velocities and three rotations along each axis. In another embodiment, control of the character may occur absent joystick control (e.g., utilizing a control device including various tilt sensors and single- and/or multi-dimensional accelerometers) but targeting of candidate objects may still occur through a joystick or some other control means.

DETAILED DESCRIPTION

Figure 1:
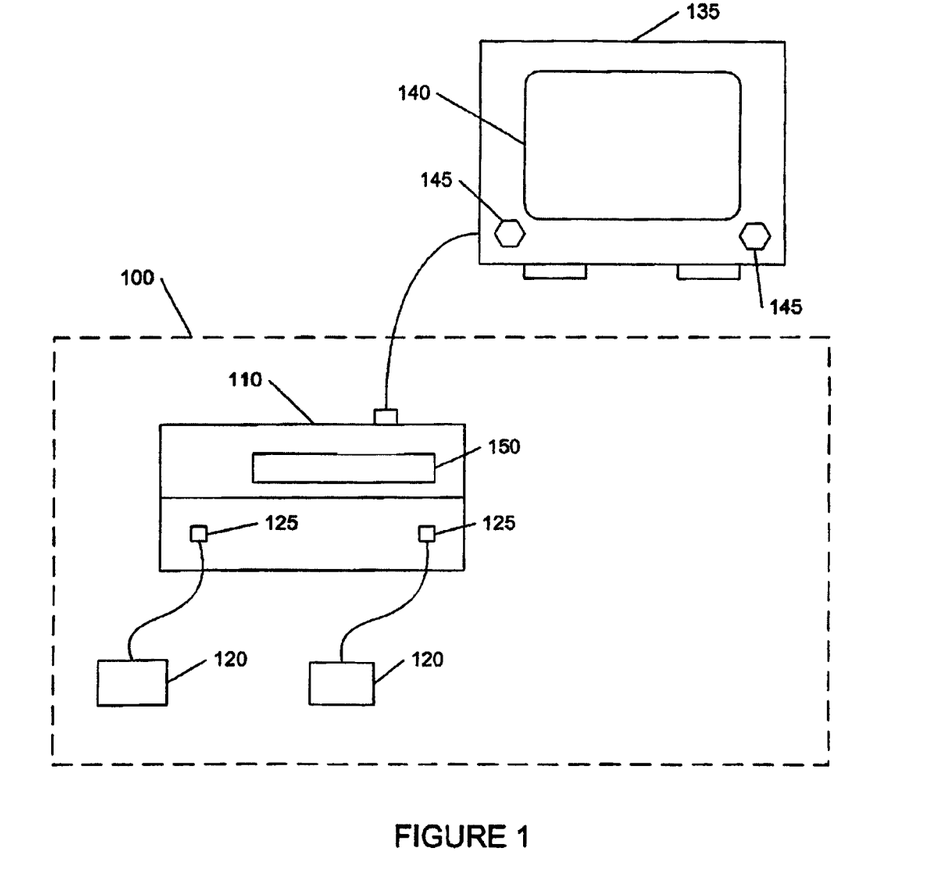
FIG. 1 is an illustration of an exemplary video game system in accordance an embodiment of the present invention.

FIG. 1 is a schematic illustration of an information processing or video game system 100. The video game system 100 may include a video game computing device 110 such as a PlayStation® 3 and one or more controllers 120 that may be communicatively coupled to the computing device 110 via respective controller interfaces 125 on the computing device 110. The controllers 120 each comprise an input device for receiving user instructions.

The video game system 100 may interface with an audio-visual (AV) output device 135 (such as a television or monitor) that is communicatively coupled to the computing device 110. The AV output device 135 may include a display screen 140 for displaying image data in accordance with signals received from the computing device 110. The AV output device 135 may also include (or be coupled to) one or more sound speakers 145 for outputting audio data in accordance with signals received from the computing device 110. Computing device 110 may be a variety of other devices capable of receiving user input instructions and displaying them to a user via a coupled AV output device or through an embedded display screen (e.g., a Playstation® Portable or a cellular phone).

The computing device may include a program reader 150 that may be configured to receive a game program storage medium, such as such as a magnetic floppy disk, an optical CD-ROM disc, a CD-R disc, a CD-RW disc, a DVD disk, or the like. Game information may be a part of the CD-ROM disc (e.g., encoded thereon) or be received via communications medium (e.g., wireless) and stored in an appropriate medium (e.g., flash memory). The game program storage medium, in one embodiment, may be a recording medium for supplying an application program such as a video game to the computing device 110. The computing device 110 may be configured to process information and execute the program instructions located on the game program storage medium. The computing device 110 may output image and sound data to the AV output device 135 in accordance with the program instructions. The computing device 110 may receive user input from the controllers 120, as described in more detail below.

Figure 2:
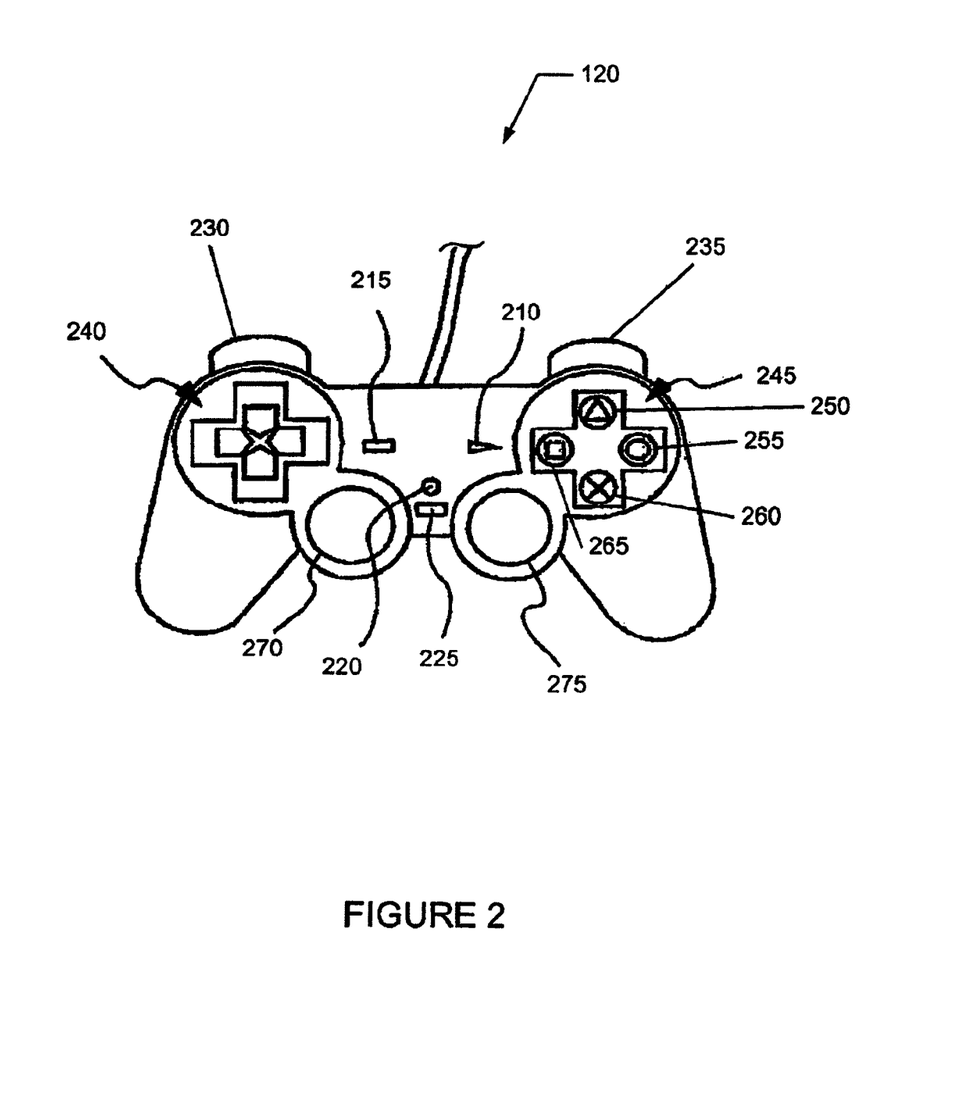
FIG. 2 is an illustration of an exemplary video game controller of the video game system illustrated in FIG. 1.

FIG. 2 is a detailed view of one of the controllers 120. The controller 120 may include one or more user input interfaces, such as buttons and/or joysticks that allow a user to input various game commands. The controller 120 may transmit signals regarding the state of the input interfaces to the computing device 110. For example, the controller 120 may transmit a signal to the computing device 110 in response to actuation of the user input interfaces, such as pressing a button or moving a joystick on the controller 120.

In some embodiments, the controller 120 may comprise a series of single-(e.g., a series of accelerometers, each dedicated to a single axis) or multi-dimensional (e.g., a single, three-axis) accelerometers, tilt sensors, and/or multi-gimbal gyroscopes. Game commands may be generated in response to accelerometer, tilt sensor, and/or gyroscope data instead of or in addition to game information generated through a potentiometer like a joystick. This data may include various forms of vector data. Vector data may be processed in a raw state or in response to various filters or other software applications that may eliminate noise and/or apply various vector data in the context of configuration data that may be generated by a user prior to playing a game (e.g., the user-identified extremes of certain tilt or roll operations). Data may also be generated by a series of LED indicators (e.g., two-sets of two arranged in a 2×2 fashion although any configuration may be implemented) on the front of the controller 120 (not shown) and positioned around the control cable coupling controller 210 to computing device 110. These LED indicators may be observed by an image capture device to provide further vector or position data related to the manipulation of the controller, and as per the mapping of controller input, to characters, objects and commands in the game environment. An optional audio pulse emitter on the controller 120 in conjunction with an audio receiver may also be used to generate position, acceleration, velocity, and/or other types of input data.

In some embodiments and through the use of, for example, multiple-axis control via the aforementioned accelerometers, tilt sensors, gyroscopes, pulse emitters, and/or LEDs, it may not be necessary to utilize a joystick input for the purpose of controlling a character in a game environment. Using such a device, the game player may navigate a character across a game environment through (in the context of a flight simulator for example) various pitch, roll, yaw, and Z-axis controls that allow the user to have a more natural interaction with the game environment via motion and position of the controller instead of having to independently navigate a joystick.

Flight control (in the case of a flight simulator-type game) or character navigation and/or action control (in general) may be established through a variety of techniques. These techniques include—but are not limited to—those based on sampling a sensed environment to track and map control gestures and activities. These techniques also include the tracking and mapping of control gestures and activities based on multi-channel input.

Notwithstanding the aforementioned joystick-free, multiple axis control offered by some controller device embodiments, the controller 120 may include a start button 210 that allows a user to transmit a start command for a game program to the computing device 110. A selection button 215 on the controller 120 may allow the user to select various game modes using a menu displayed on the AV output device 135. A mode selection button 220 may be used by the user to vary controller modes between digital and analog. An LED lamp 225 (not associated with the bank of LEDs on the front of the controller) may indicate a controller mode (analog or digital). The controller 120 may also include a left shoulder button 230 and a right shoulder button 235 that may be associated with inputs with respect to a game application. A second set of shoulder buttons may be positioned below left shoulder button 230 and right shoulder button 235 and along the front of the control device (not shown) thereby offering additional user control.

The controller 120 may include a first game operational input 240 and a second game operational input 245. The second game operational input 245, in one embodiment, may include a plurality of controller buttons, including a first controller button 250, a second controller button 255, a third controller button 260, and a fourth controller button 265. Each controller button 250, 255, 260, 265 may be associated with an identifier that may be used to identify and distinguish the controller buttons 250, 255, 260, 265. The identifier may comprise a symbol that is labeled on or near the associated controller button. For example, the first controller button 250 may be associated with a triangle symbol, the second controller button 255 may be associated with a circle symbol, the third controller button 260 may be associated with an X symbol, and the fourth controller button 265 may be associated with a square symbol. Each symbol to be associated with a controller button may be labeled on or near the corresponding controller button.

The controller 120 may also include first and second directional input interfaces, such as a first joystick 270 and a second joystick 275. The first and second joysticks 270, 275 may comprise sticks that may be positioned in a neutral position or moved into a non-neutral position by moving the stick in a particular direction. Movement of the joysticks 270, 275 into a non-neutral position in a given direction may result in the controller 120 outputting a corresponding directional command to the computing device 110 in a digital format, causing a corresponding movement or action in the video game environment. This movement may be related to the actual game character or some aspect of the character (e.g., a particular body part or a targeting interface). It will be appreciated that the configuration of the controller 120 could be modified to include more or less user input interfaces and also to vary the locations of the input interfaces.

Figure 3:
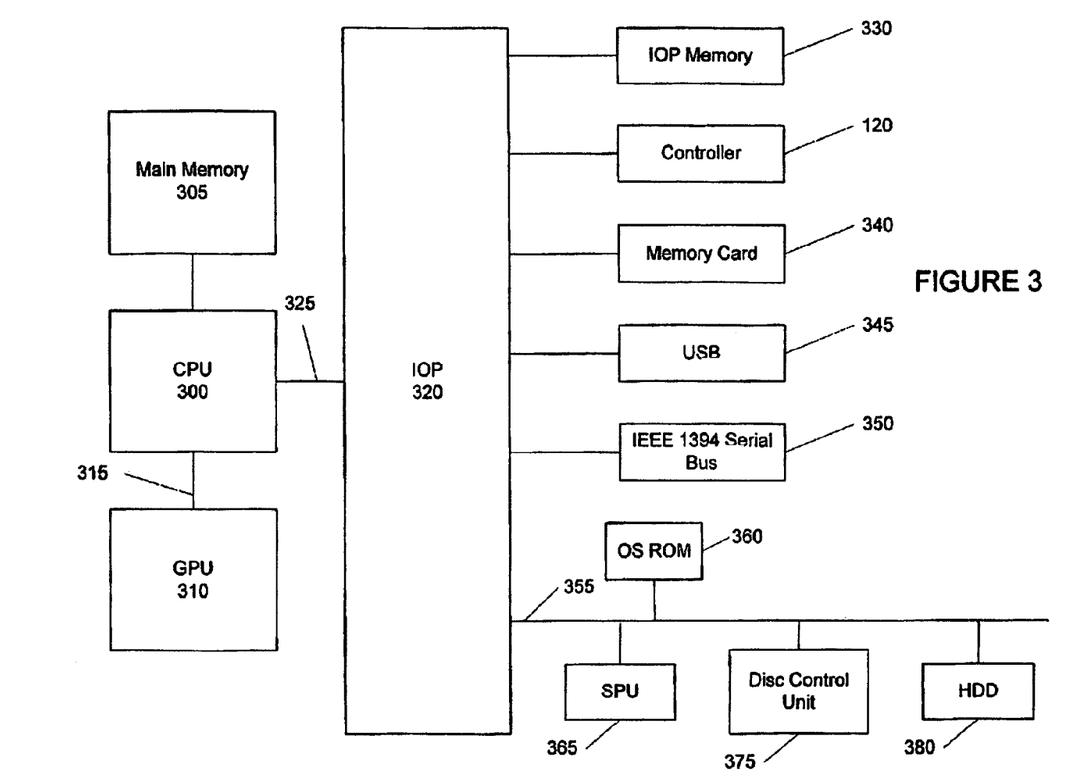
FIG. 3 illustrates a block diagram of an exemplary hardware configuration of the entertainment system shown in FIG. 1.

FIG. 3 is a block diagram of an exemplary hardware configuration of the entertainment system shown in FIG. 1. The video game system 100 may include a central processing unit (CPU) 300 that is associated with a main memory 305. The CPU 300 may operate under control of programming steps that are stored in the OS-ROM 360 or transferred from a game program storage medium to the main memory 305. The CPU 300 may be configured to process information and execute instructions in accordance with the programming steps.

The CPU 300 may be communicatively coupled to an input/output processor (IOP) 320 via a dedicated bus 325. The IOP 320 may couple the CPU 300 to an OS ROM 360 comprised of a non-volatile memory that stores program instructions, such as an operating system. The instructions may be transferred to the CPU via the IOP 320 at start-up of the computing device 110.

The CPU 300 may be communicatively coupled to a graphics processing unit (GPU) 310 via a dedicated bus 315. The GPU 310 is a drawing processor that may be configured to perform drawing processes and formulate images in accordance with instructions received from the CPU 300. For example, the GPU 310 may render a graphics image based on display lists that are generated by and received from the CPU 300. A buffer for storing graphics data may be coupled to or a part of GPU 310. The GPU 310 may output images to the AV output device 135.

The IOP 320 may control the exchange of data among the CPU 300 and any peripheral components in accordance with any instructions that may be stored in an IOP memory 330. The peripheral components may include one or more controllers 120, a memory card 340, a USB 345, and an IEEE 1394 serial bus 350. Additionally, a bus 355 may be communicatively coupled to the IOP 320. The bus 355 may be linked to several additional components, including but not limited to the OS ROM 360, a sound processor unit (SPU) 365, an optical disc control unit 375, and a hard disk drive (HDD) 380.

The SPU 365 may be configured to generate sounds, such as music, sound effects, and voices, in accordance with commands received from the CPU 300 and the IOP 320. The SPU 365 may include a sound buffer in which waveform data is stored. The SPU 365 may generate sound signals and transmits the signals to the speakers 145 (FIG. 1).

The disc control unit 375 may be configured to control the program reader 150 (FIG. 1), which may comprise, for example, an optical disk drive that accepts removable storage media such as a magnetic floppy disk, an optical CD-ROM disc, a CD-R disc, a CD-RW disc, a DVD disk, or the like. The memory card 340 may comprise a storage medium to which the CPU 300 may write and store data. In some embodiments, the memory card 340 may be inserted and removed from the IOP 320. A user may, in some embodiments, store or save game data using the memory card 340. In addition, the video game system 100 may be provided with at least one hard disk drive (HDD) 380 to which game data may be written and stored.

A data I/O interface, such as an IEEE 1394 serial bus 350 or a universal serial bus (USB) 345 interface may be communicatively coupled to the IOP 320 in order to allow data to be transferred into and out of the video game system 100. The video game system 100 may be configured to implement a game that is realized when the CPU 300 executes program instructions that may be read from a program storage medium loaded in the computing device 110.

Figure 4:
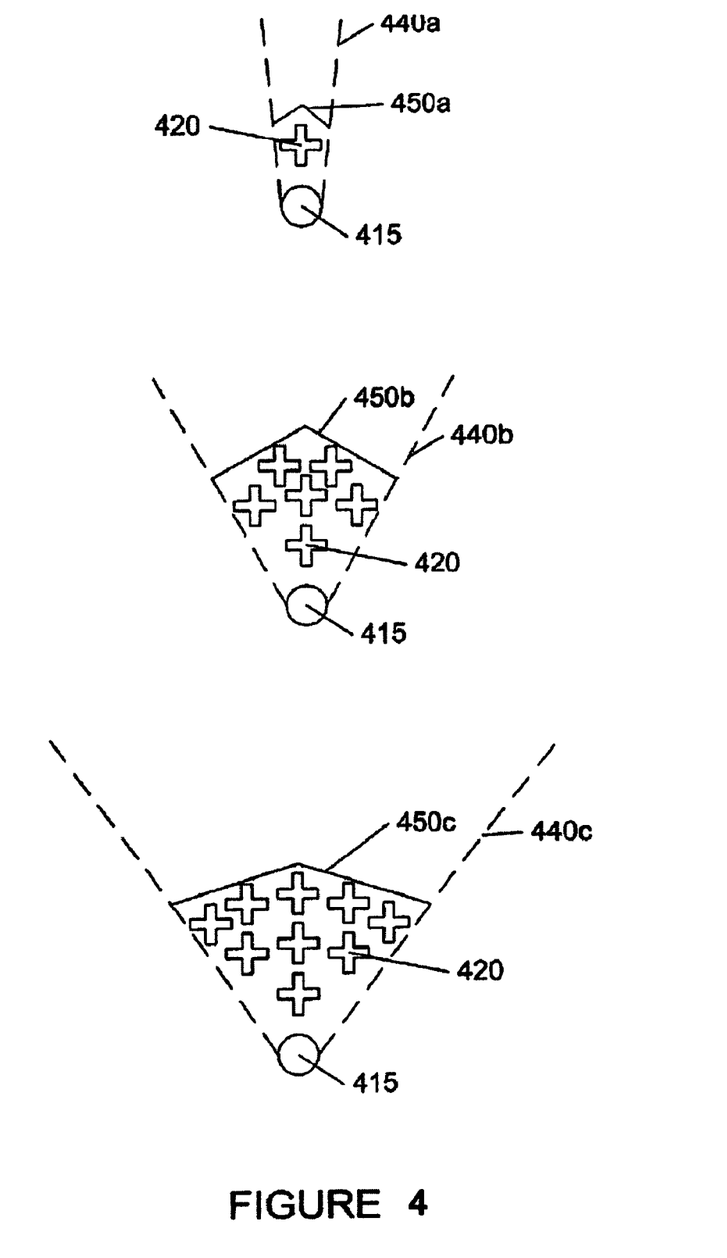
FIG. 4 illustrates three examples of differently sized target range indicators in an exemplary embodiment of the present invention.

FIG. 4 shows three examples of differently sized target range indicators 440 in an exemplary embodiment of the present invention. The target range indicator 440a may be for a heat-seeking missile type weapon, the target range indicator 440b may be for a cluster missile type weapon (which can attack more enemies at one time than a single heat-seeking missile), and the target range indicator 440c may be for an EMP-type weapon (which can attack even more enemies than a cluster missile). The size of the target range indicator 440 may vary as a function of the weapon. It should be appreciated that the weapons named herein are exemplary and that the particular type of weapon and a related target range indicator 440 may vary in accordance with the same. Further, certain weapons may be able to lock-on and track a target off-screen (e.g., behind or beside a character object) for a certain period of time and subject a particular state of the game (e.g., environmental or weather conditions).

In some embodiments of the present invention, the target range indicator 440 may not be displayed in the gaming environment. The size and range of the indicator 440, in such an embodiment, may be appreciated by the computing device 110 and related game software but may not actually be displayed on a display unit 135. Various other implementations of the indicator 440 may also be used such as a variable size heads-up display range finder, which may reflect the ability to lock-on to an enemy in terms of an x-dimension and a z-dimension while the y-dimension (i.e., the furthest range; the attack range indicator 450) may be related to visual line-of-sight or some other indicator (e.g., color) of range.

As shown in FIG. 4, the attack range indicator 450 for each target range indicator 440 encompasses a number of enemy characters 420. The number of enemy characters that fit within an attack range indicator may correspond to, but is not necessarily limited to, the attack capabilities of the corresponding weapon. For example, only one enemy character may fit within the attack range indicator 450a for the heat seeking missile. This indicates that this particular missile can only target one enemy character at a time. On the other hand, the attack range indicator 450b for the cluster missile weapon holds 6 enemy characters. This indicates that the cluster missile may be limited to targeting a maximum of 6 enemy characters at one time. This limitation may be further related to the actual number of missiles or clusters of missiles the game character 415 presently has in their possession (e.g., available ammunition). The attack range indicator 450c for the EMP-weapon holds 9 enemy characters, indicating that the EMP may be able to target up to 9 enemy characters at once.

In alternative embodiments of the present invention, there may be no limit as to the number of enemy characters that may be targeted. For example, the game character 415 may orient an HUD/range-finder over an unlimited number of enemy targets and lock-on to the same for eventual attack subject to the availability of a particular weapon and/or ammunition related to the same. For example, in the case of a cluster missile (440/450b), the game character 415 may target as many enemy characters 420 as can be tracked by the HUD/range-finder and made subject to attack. Similarly, with the EMP weapon (440/450c), all characters presently visible on the screen (and perhaps even out of the line-of-sight of the game character 415 such as those behind or beside the character 415) may be subject to the attack range of the particular weapon.

Figure 5:
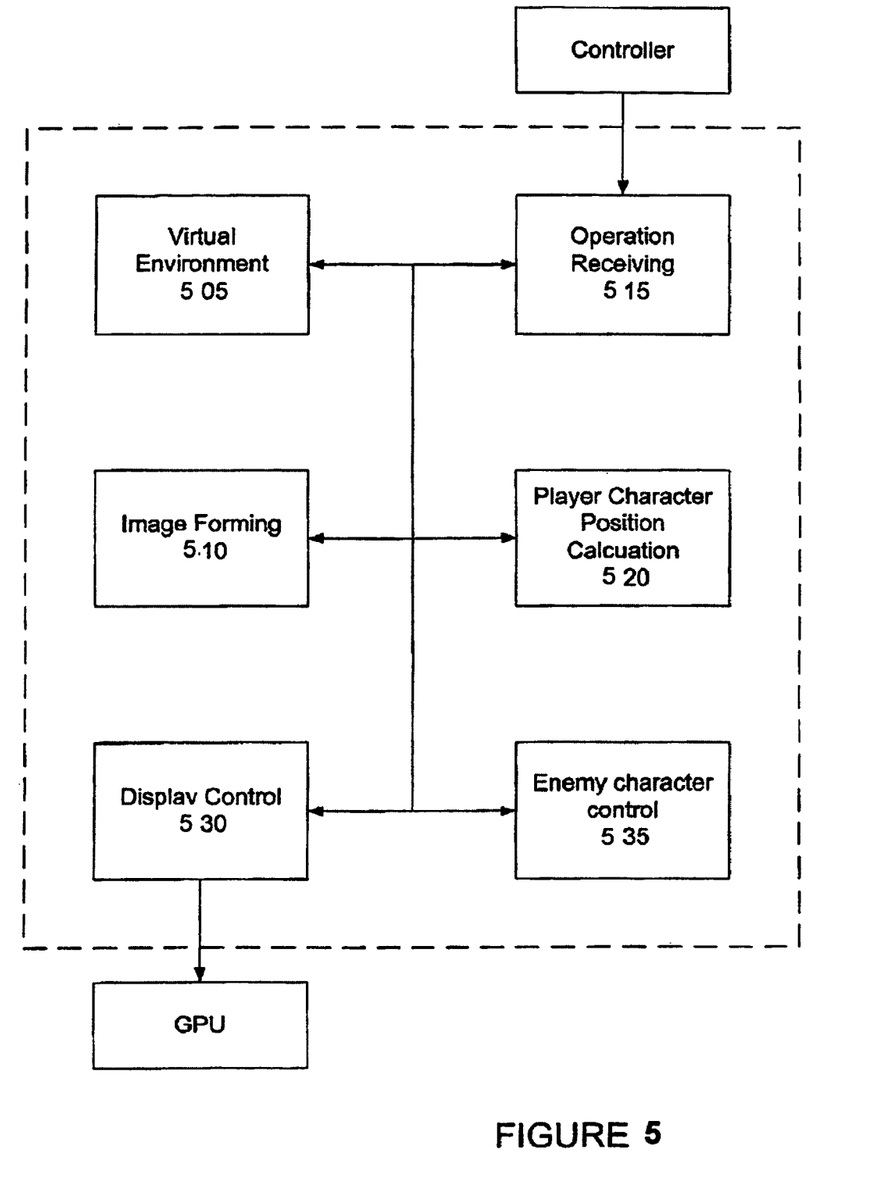
FIG. 5 illustrates a block diagram for an exemplary software structure for implementing a target interface in accordance with exemplary embodiments of the present invention.

FIG. 5 is a block diagram that shows an exemplary software structure for implementing a target interface in accordance with exemplary embodiments of the present invention. A virtual environment data base 505 may store data that describes the virtual environment. The virtual environment could be a finite, two-dimensional space that is managed as an X-Y coordinate system. Thus, any position in the virtual environment may be specified in the form of coordinates (x,y). The virtual environment may be divided into one or more blocks, wherein each block has a set of attributes that describe a portion of the virtual environment. The attributes may determine geographical information of the virtual environment and could comprise code for expressing a road, a river, a hill, a forest, etc. The blocks may also include image data for creating an image associated with the block.

An image forming module 510 may communicate with the virtual environment database 505. The image forming module 510 may provide position and color information for the GPU 310. An operation receiving module 515 may communicate with the controller 120. The operation receiving module 515 may accept signals from the controller 120 regarding the states of the input interfaces on the controller 120 (e.g., potentiometers or vector data from various accelerometers, gyroscopes, and/or tilt sensors as well as LED banks and pulse emitters). The operation receiving module 515 may determine an action of the player character in accordance with the game player actuating the controller 120. The operation receiving module 515 may determine movement direction of the player character through the virtual environment and may also determine when the player character should initiate attacks. The movement directions of the joysticks 270 may correspond to movements of the player character although the vector data from the aforementioned accelerometers, gyroscopes and/or tilt sensors may also be used as well as LED bank and pulse emitter data. The operation receiving module 515 may determine when the target range indicator 440 should be displayed in response to actuation of an input interface on the controller 120 or implemented with regard to a HUD/range-finder or other targeting interface or tool.

A player position calculation module 520 may perform a process for calculating the position and movement of the player character in the virtual environment. In response to signals from the operation receiving module 515, the player position calculation module 525 may periodically calculate the position of the player character with respect to a previous position in the virtual environment. The player position calculation module 515 may then determine a movement direction for the player character. An enemy control module 535 may also be implemented that maintains the position of each enemy character. The enemy control module 535 may control movement of the enemy characters through the virtual environment.

A display control module 530 may accept image information, such as position and color information, from the image forming module 510 and the player position calculation module 520 and then forwards rendering instructions to the GPU 310 for processing.

Figure 6:
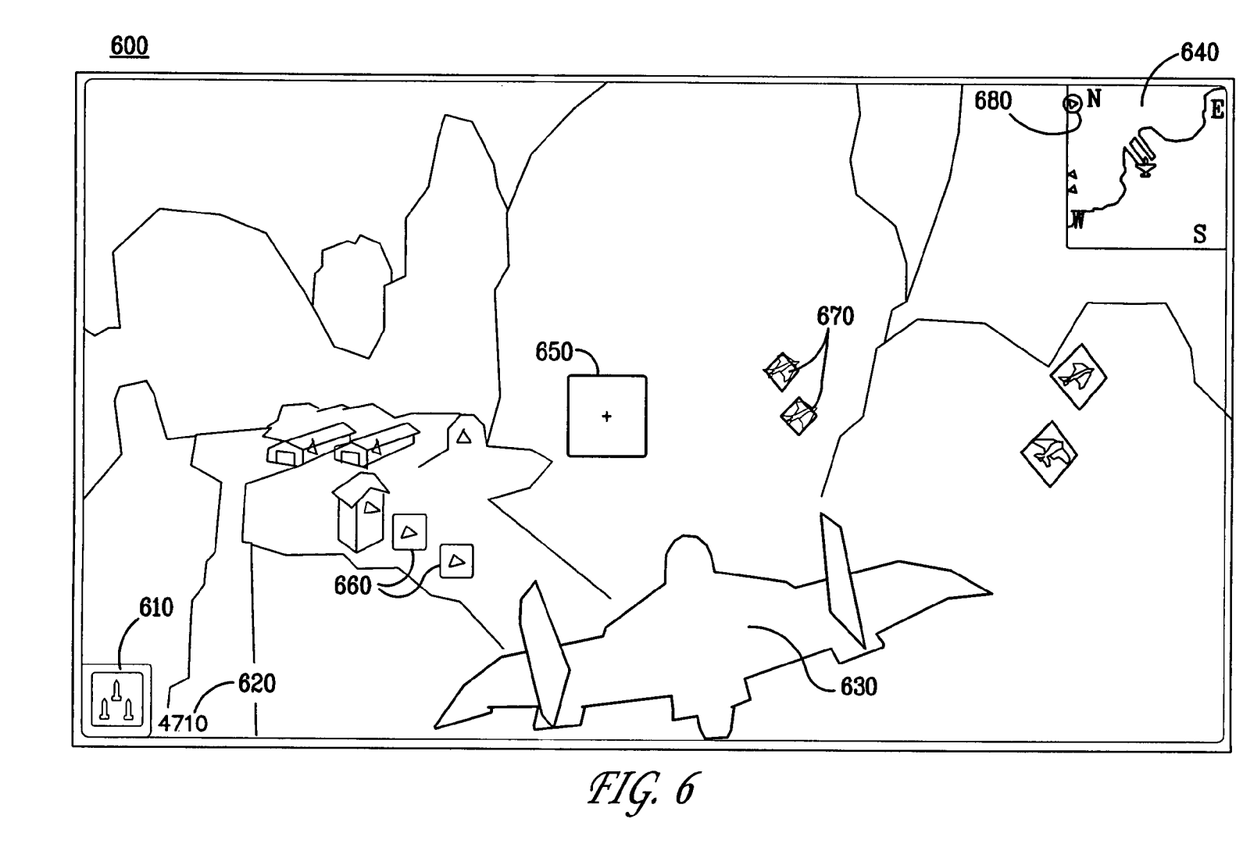
FIG. 6 illustrates an exemplary game environment with a character object, target display and various enemy targets.

FIG. 6 illustrates an exemplary game environment 600 with a character object, target display, and various enemy targets in accordance with an exemplary embodiment of the present invention. The game environment may comprise a weapons indicator 610 reflecting the type of weapon currently available for attack and an ammunition indicator 620 reflecting the number of rounds or particular type of ammunition remaining. Character object 630 is illustrative of the virtual environment representation of the game player, in this case a VTOL attack aircraft. Other character objects, depending on the nature of the game, may be used (e.g., a warrior or a tank). An overview map 640 may be a part of the game environment illustration, showing the position of the character object 630 as well as various objective targets 680 in the environment. The placement of the objective targets 680 may be relative the position of the character object 630.

Objective targets 680 may be land/water-based (660) or in-flight targets (670). An objective target 680 may be a facility that needs to be destroyed in the case of a land-target or enemy attack craft such as in-flight targets. Both in-flight and land-target objective targets 680 are indicated by a target indicator 670 and 660, respectively. Target indicators 660/670 may be of different shapes or sizes depending on the nature of the target (e.g., land targets are squared and in-flight targets are diamonds) or the importance of the target (e.g., strategic value). Coloration of the target indicator 660/670 may also be used to indicate status (e.g., light damage, critical damage, etc). In some embodiments of the present invention, these indicators may not be displayed until the target has been locked onto and is subject to an attack (e.g., an in-flight target will not display a diamond target indicator 670 until it has been targeted and locked onto by the target display 650).

Target display 650 may indicate, by the size of the display (e.g., width and/or height) target range (440). For example, one weapon may have a particular target range 440 that equates to one particular size of the target display 650 whereas a more powerful weapon may have a wider target range 440 that would equate to a larger target display 650 size.

The environment 600 and target display 650 may not necessarily reflect an attack range (e.g., how far away can an enemy be targeted?) as is the case in FIG. 4. Instead, attack range may be reflected by color. For example, if an enemy is within the attack range 450, then the target display 650 may glow red. If an enemy is not within the attack range 450, then the target display 650 may glow blue notwithstanding the fact that an enemy target may be dead-center in the target display 650 and otherwise visible to the game player. In some embodiments, an out-of-range target may simply not be targeted. That is, there may be no particular indicator of inability to target notwithstanding visibility of the target. If a target goes out-of-range after it has been locked-on, a target indicator (e.g., 670) may be removed from the target (e.g., an in-flight target may no longer reflect diamond target indicator 670 if it has gone out of range prior to a weapon being fired). The target display 650 may also include a center indicator (e.g., cross-hairs) to further indicate dead-center and to assist in aiming accuracy.

In some embodiments, a target display may indicate a target in the distance as a single large display object; for example, a single square (target indicator). As a game player object (e.g., an attack aircraft) comes closer to the objective target, the target display may break the single square (target indicator) down into smaller individual targets (e.g., individual squares (target indicators) for individual targeting).

Figure 7:
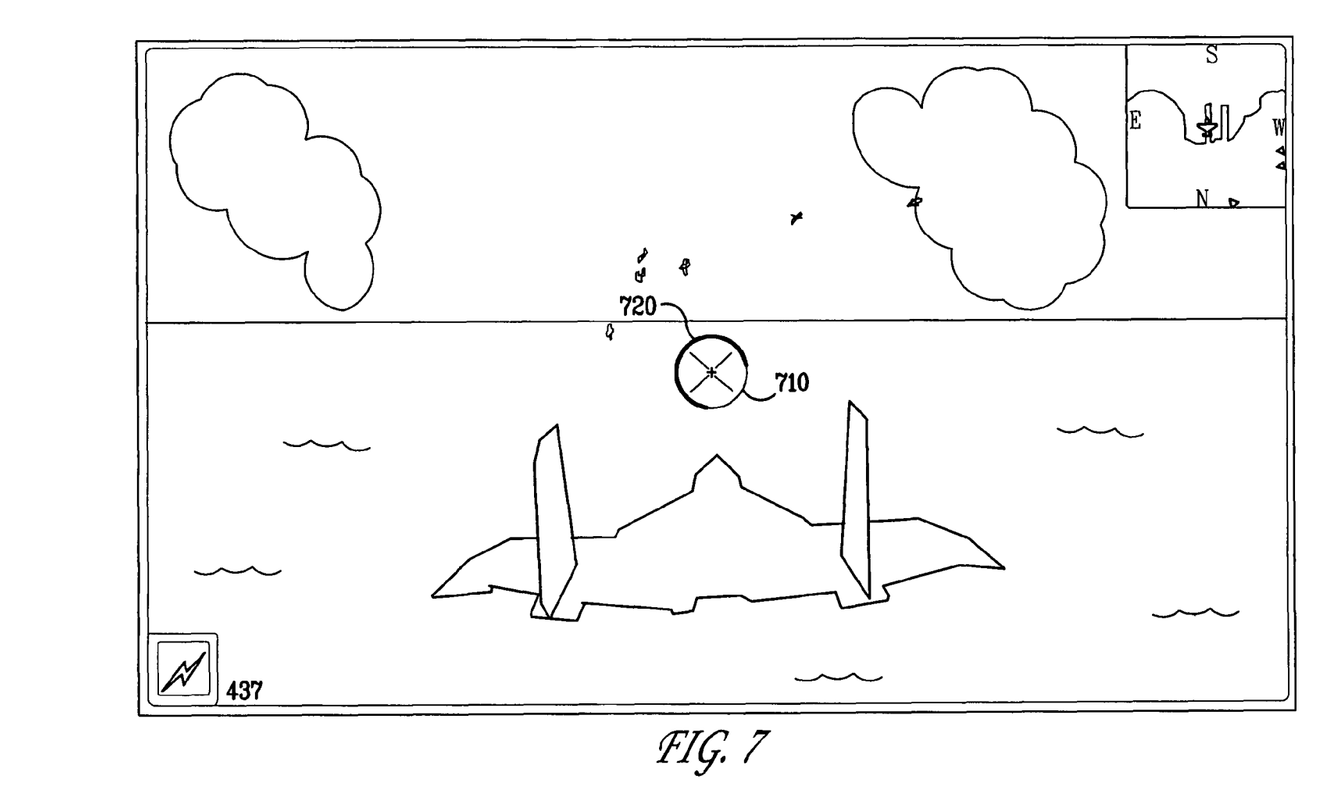
FIG. 7 reflects an exemplary game environment where the target display may be indicative of target range, of attack range, and weapon status.

FIG. 7 reflects an exemplary game environment 700 where the target display 710 may be indicative of target range 440 by its size/shape and of attack range 450 by its color, and also a weapon status state via a charge indicator 720. Charge indicator 720 may wrap around the target display as in the case of target display 710. As the weapon is charged (e.g., in the case of an EMP weapon), the charge indicator 720 may complete its 'wrap around' of the target display 710. Once the charge indicator 720 reflects a full charge (e.g., it has wrapped all the way around the target display 710), the weapon may enjoy its full target range, its full attack range, full strength and/or the ability to be fired. If the related weapon is fired prior to a full charge being obtained (e.g., wherein the indicator 720 may only wrap half-way around the display 710), the weapon may fire but may be off target, not travel the intended distance, miss targets otherwise within the target range 440 or not inflict the fullest possible damage. In some instances, the weapon may not fire at all and the charge may be lost thereby requiring that the charge be re-accumulated (e.g., a misfire).

The charge indicator 720 may also be related to game player accuracy. For example, if a user is utilizing a machine gun and is hitting targets with a certain degree of accuracy for every round fired, the charge indicator 720 may increase in power thereby reflecting, for example, additional fire power, additional range, more rapid firing, more damage and so forth. In this regard, the charge indicator 720 may actually reflect a reward to the user in that the user may be exhibiting particularly admirable game skills in hitting targets subject to the particular range of a particular weapon.

A particular charge or accuracy bonus may be indicated not only by the completeness of the wrap around of the charge indicator 720 but also by color, intensity of a particular color, or various audio cues generated by a game. Some enemy targets, too, may require an extended presence within the target display 710. The charge indicator may also reflect if the enemy target has been within the particular display for the proper period of time to indicate that the target has been locked-on to and that weapons may now fire to ensure a hit of the target.

The charge indicator 720 may also be displayed as a bar graph that is separate from the target display 710. For example, the indicator (e.g., in bar graph form) may be embedded in the corner of the game environment such as to minimize interference with viewing the overall environment (e.g., near a weapons and/or ammunition indicator). Other display methods may be used including line graphs, brightness indicators, audio cues, vibration of a control device, 'ready' lights on an artificial control panel in the environment and so forth.

Various other target displays may reflect lock-on, weapons charge and the like. For example, the display may flash to indicate lock-on or charge or have a small or larger display overlap the original target display. The one or more display indicators may also interact with one another (e.g., one indicator flashes within another, zooms-in on top of another, and so forth). Audios cues, too, may be used. A variety of various lock cues are within the scope of the present invention.

Figure 8:
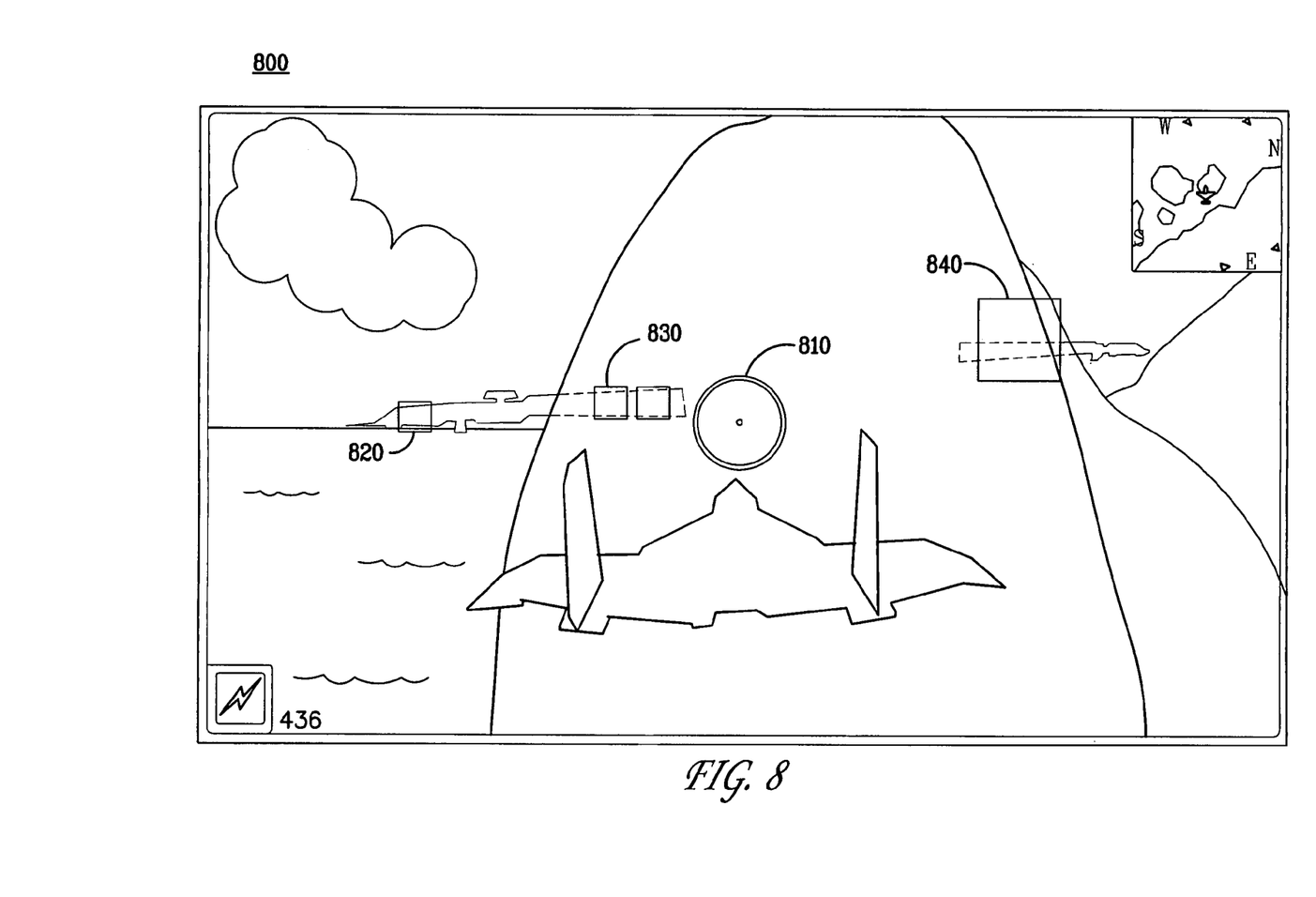
FIG. 8 reflects an exemplary game environment where certain targets are partially or totally obscured from a game player's line of sight.

FIG. 8 reflects an exemplary game environment 800 where certain targets are partially or totally obscured from a game player's line of sight. Environment 800 reflects a target display 810 which also includes, for the sake of reference, a charge indicator that (at present) reflects zero charge or, at noted above, may also be indicative of zero-lock. In the present example, certain objective targets are visible like that reflected by target indicator 820. Subject to (for example) the game player orienting his target display 810 onto target indicator 820, that particular target may be subject to weapons-lock and weapons could be fired to attack that enemy target. Other objectives are partially or totally obscured as is the case with objectives and related indicators 840 and 830, respectively.

Through various Z-buffering techniques as are known in the art, the game software and the computing device executing that software may be able to reflect that a target exists but that the target is visually obscured by a particular object in the environment, in this case, a mountain. With respect to actual targeting of that object, a ray may be extended from some point on the character object to the objective target (e.g., a straight line from the center of the HUD to the target with an orientation associated with the direction of travel of the character object or oriented from a particular weapon such as a machine gun on a rotating turret or the like). If the ray is intersected by any polygon object in the game environment prior to reaching the actual objective target, then the user's line of sight may be occluded and weapons lock may not occur or may (like in the case of target 830) require additional time to ensure complete weapons lock in the case of a partially occluded target 840. Occlusion may also be related to particular coloration of a target indicator. For example, occluded parts of the target may be displayed as blue while non-occluded portions may appear red.

Occlusion determination may be ongoing. For example, a target presently indicated as being occluded may be, seconds later and subject to the movement of a particular object in the environment that was blocking the target, within range of the character object. The target may then be subject to targeting. As such, occlusion detection may be constant with regard to all, some, or particularly designated targets or may alternatively occur in response to a user indication such as actuation of a target display. Various methodologies for determining occlusion may be utilized such as those disclosed in U.S. Pat. No. 6,995,788 for a System and Method for Camera Navigation.

An exemplary methodology in the aforementioned '788 patent is the use of a sphere along a ray to more accurately identify the extent to which an object is occluded. For example, if any portion of the sphere traversing the aforementioned ray from the player object to the objective target comes into contact with the corner of a polygon, there may be occlusion of that target. Various degrees (or permissions) of occlusion may be controlled through the size of the sphere (or some other object) thereby making occlusion more or less likely dependent on the sphere/object size relative the nature of the environment (e.g., combat in clear sky versus fighting in a mountain range). The size of the sphere or other occlusion detection object may be related to a particular weapon, the range of that weapon, the intelligence of a weapon (e.g., a machine gun versus a heat-seeking missile) and/or certain defenses of the enemy target. Various colorations, size of target indicators, intensity of target indicators and the like (e.g. flashing and/or audio cues) may also be used to indicate whether or not a target may be locked onto with respect to possible occlusion.

Figure 9:
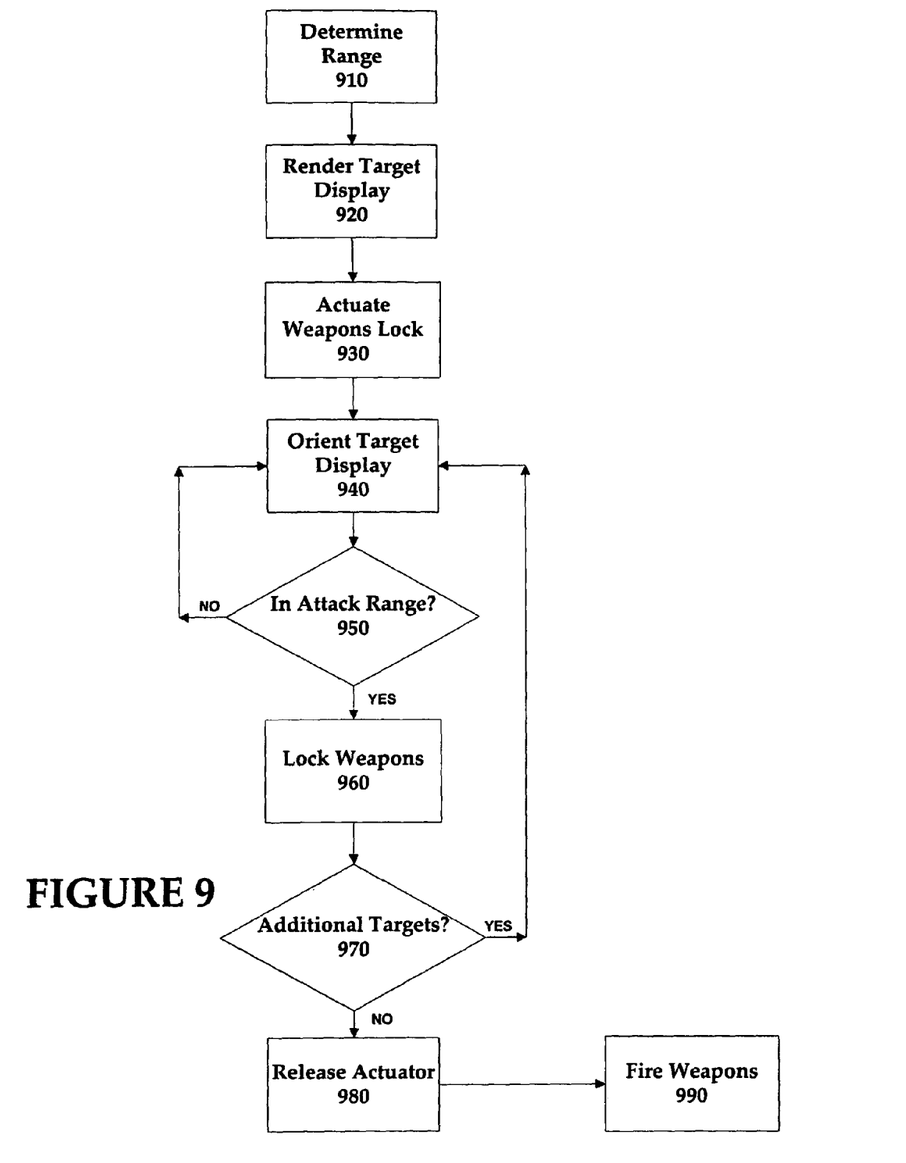
FIG. 9 illustrates an exemplary targeting method using an embodiment of the exemplary targeting interface described herein.

FIG. 9 illustrates an exemplary method 900 for targeting using an embodiment of the exemplary targeting interface described herein. The steps identified in FIG. 9 (and the order thereof) are exemplary and may include various alternatives, equivalents, or derivations thereof including but not limited to the order of execution of the same. The steps of the method of FIG. 9 (and its various alternatives) may be embodied in hardware or software including a machine-readable medium (e.g., optical disc, memory card, carrier waves, etc.) including programs and/or instructions executable by a machine such as the processor of a computing device. The method may be executed in conjunction with a control device including a variety of accelerometers, tilt sensors, and/or gyroscopes, as well as (or in addition to) LED banks and/or pulse emitters that may allow for smooth and natural targeting through, for example, an HUD and relative to a particular target as the character object navigates the game environment.

In step 910, the target range (440) of a particular weapon may be determined. In step 920, the target display may be indicated in the game environment. The size of the target display may be related to the aforementioned target range (440).

In step 930, a game player may actuate a target lock sequence by pressing a particular button on a controller device or provide some other form of input indicating the need to lock weapons on one or more targets (e.g., a vocal command received through a USB microphone). In step 940, where target lock may still be actuated through a button press, the game player may orient the display over a target utilizing various pitch, roll, yaw, and Z-axis control (e.g., through a three-axis accelerometer, a series of tracking LEDs, or a pulse emitter). In step 950, it may be determined whether the target within the target display is within attack range (450) as may be governed by the particular weapon. If the target is in attack range (450) and the target range (440) as may be indicated by the size of the target display, the target may be locked onto in step 960 and may remain locked until it is out of the attack range (450) or the target range (440) as may be governed by a particular weapon selection. If the target is not in attack range (450), then the user may reorient the display to another target that may be in range or travel closer to that target or select a weapon with greater attack range.

After lock has occurred in step 960, the user may target additional targets in step 970 using a similar methodology. Once a user has indicated the number of targets he wishes to attack, the user may release the actuation that initiated lock-on in step 980 and weapons may fire in step 990. Through this method, the user may need only press a targeting actuation button once, orient the target display over various enemy targets using, in one embodiment, the multi-axis control and then release the actuator to fire. Weapons may be fired at all targets at once or in quick automated succession to avoid the need to repeatedly press a 'fire' button or similar command tool. In some embodiments, actuation of lock-on may be initiated with a single button push and weapons-fire may be initiated with a subsequent push instead of a single hold and release as was described above. Various voice controls may also be utilized (e.g., "lock on" and "fire").

Once the weapons fire, the targeted enemies may be destroyed in the order of targeting, subject to present proximity, current damage, current priority, current threat level, or any other variety of factors. For example, if a particular weapon is a heat-seeking missile and certain targets emit more heat than others, those heat-emitting targets may be subject to destruction first.

In some embodiments of the present invention, the target display may be oriented independent of the game object (e.g., the attack aircraft). In such an example, the user may fly the aircraft using joystick-fee control (e.g., accelerometers, tilt sensors, and the like in the controller) while using another input control tool (e.g., the joystick on the controller) to target enemies as would occur with, for example, a gun turret or some other independently operated weapon. In this way, a user may have independent weapons control with regard to enemy targets while still flying the aircraft.

Various weapons select methodologies may also be used wherein a separate control button or other input device (e.g., voice) indicates the need to cycle through or select a particular weapon. For example, the quick tap of a weapon select button may cycle from one weapon to the next. An extended press and hold may bring up a selection map that may then be navigated with a joystick, voice control, or repetitive tapping of a particular button. Similarly, certain buttons may be associated with certain weapons.

Various methodologies for assigning attack icons to a target and as disclosed in U.S. patent application Ser. No. 09/773,452 filed Jan. 31, 2002 and entitled "Game Playing System with Assignable Attack Icons" may be utilized in the practice of the present invention.

The present invention has been described above in terms of an exemplary embodiment so that an understanding of the present invention may be conveyed. There are, however, many configurations for entertainment systems not specifically described herein but with which the present invention may be applicable. The present invention should therefore not be seen as limited to the particular embodiments described herein, but rather, it should be understood that the present invention has wide applicability with respect to entertainment systems and video games generally. All modifications, variations, or equivalent arrangements and implementations that are within the scope of the attached claims should therefore be considered within the scope of the invention.

What is claimed is:

1. A targeting system, comprising:
    a computing device that executes software to display a game environment and automatically generate a target display within the game environment, the target display operating independent of manipulation of a character object associated with the target display, the target display indicating a plurality of candidate objects detected in the game environment, a size of the target display indicating a target range of a selected weapon and a color of the target display indicating an attack range of the selected weapon; and
    an actuator on a controller device, the controller device communicatively coupled to the computing device, the actuator on the controller device associated with the manipulation of the target display, wherein:
        actuation commences identifying each candidate object in the game environment subject to attack by the character object, wherein each candidate object is identified as being subject to attack when each of the candidate objects is within the target range and the attack range indicated by the size and color of the target display, and
        termination of actuation followed by a fire command automatically commences attack of all the candidate objects identified by the target display as subject to attack by the character object.

2. The targeting system of claim 1, wherein manipulation of the target display in the game environment occurs in response to commands generated by a joystick at the controller device.

3. The targeting system of claim 1, wherein manipulation the target display in the game environment occurs in response to commands generated by motion of the controller device, the commands including vector data.

4. The targeting system of claim 3, wherein the vector data generated by motion of the controller device comprises data generated by an accelerometer.

5. The targeting system of claim 3, wherein the vector data generated by motion of the controller device comprises data generated by a tilt sensor.

6. The targeting system of claim 3, wherein the vector data generated by motion of the controller device comprises data generated by a gyroscope.

7. The targeting system of claim 1, wherein manipulation the target display in the game environment occurs in response to commands generated by motion of the controller device, the motion of the controller device indicated by a series of light emitting diode (LED) indicators at the controller device and tracked by an image capture device.

8. The targeting system of claim 1, wherein manipulation the target display in the game environment occurs in response to commands generated by motion of the controller device, the motion of the controller device indicated by audio pulses emitted at the controller device and tracked by an audio receiver.

9. The targeting system of claim 1, wherein manipulation the target display in the game environment occurs in response to commands generated by tracking and mapping control gestures from multi-channel input.

10. The targeting system of claim 1, wherein the target range and attack range of the target display vary as a function of the selected weapon.

11. The targeting system of claim 1, further comprising an indicator of a charge status for the selected weapon, wherein the indicator is generated by execution of software at the computing device.

12. The targeting system of claim 1, further comprising an indicator of accuracy with respect to the selected weapon and attacks commenced against candidate objects in the game environment, wherein the indicator is generated by execution of software at the computing device.

13. The targeting system of claim 1, further comprising a weapons indicator reflecting a weapon available for targeting in conjunction with the target display and an ammunition indicator.

14. The targeting system of claim 1, further comprising an overview map indicating a position of an objective target in the game environment with respect to a position of the character object in the game environment, wherein the objective target includes a candidate object, and wherein the overview map is generated by execution of software at the computing device.

15. The targeting system of claim 14, wherein the shape and size of a target indicator associated with the objective target varies on the nature of the objective target.

16. The targeting system of claim 14, wherein the shape and size of a target indicator associated with the objective target varies on the importance of the objective target.

17. The targeting system of claim 14, wherein the color of a target indicator associated with the objective target varies with the status of the objective target.

18. The targeting system of claim 14, wherein the objective target comprises a series of objective targets and wherein the series of objective targets are displayed in the target display as a single target indicator at a first distance of the character object from the series of objective targets and wherein the single target indicator breaks into a series of individual target indicators each of the series of individual target indicators associated with one of the series of objective targets at a second distance of the character object from the series of objective targets.

19. The targeting system of claim 1, wherein a target indicator associated with a candidate object indicates whether the candidate object is at least partially occluded by a non-candidate object in the game environment with respect to the character object.

20. The targeting system of claim 19, wherein at least partial occlusion is determined by extending a ray from a point on the character object to a point on the candidate object and if the ray is intersected by non-candidate object in the game environment, the candidate object is at least partially occluded.

21. The targeting system of claim 1, wherein manipulation of the target display in the game environment is independent of manipulation of the character object in the game environment.

\* \* \* \* \*